United States Patent [19]

Oughton, Jr.

[11] Patent Number: 4,988,889

[45] Date of Patent: Jan. 29, 1991

[54] POWER SOURCE FOR EMERGENCY LIGHTING SYSTEMS

[75] Inventor: George W. Oughton, Jr., Raleigh, N.C.

[73] Assignee: Self-Powered Lighting, Inc., Elmsford, N.Y.

[21] Appl. No.: 374,697

[22] Filed: Jul. 3, 1989

[51] Int. Cl.⁵ .............................................. H02J 9/06
[52] U.S. Cl. ........................................ 307/66; 315/86; 323/222; 340/333; 340/782; 340/815.03
[58] Field of Search .................. 323/222, 224, 266; 363/89, 21; 315/86; 307/66, 22, 23; 340/782, 333, 815.03

[56] References Cited

U.S. PATENT DOCUMENTS

| | | | |
|---|---|---|---|
| 4,395,639 | 7/1983 | Bring | 307/66 |
| 4,488,057 | 12/1984 | Clarke | 307/66 |
| 4,510,400 | 4/1985 | Kiteley | 307/66 |
| 4,672,228 | 6/1987 | Swoboda | 307/66 |
| 4,682,147 | 7/1987 | Bowman | 307/66 |

Primary Examiner—William H. Beha, Jr.
Attorney, Agent, or Firm—Watson, Cole, Grindle & Watson

[57] ABSTRACT

A buck/boost converter is driven by a high frequency dc-to-dc flyback converter to provide substantially constant output power, independent of the output voltage, to an inductor to provide current to a load having a v-i characteristic that is suitable for use with a current power source, such as a plurality of parallely-connected LEDs. The flyback converter repetitively generates a battery-simulated output voltage that is current-limited and which may be used to charge a battery as well as to provide power to the buck/boost converter. The buck/boost converter includes a switching circuit for repetitively transferring current to the load and a current sensor circuit operating in conjunction with the switching circuit to change the state of the buck/boost converter to repetitively open the switching means and initiate release of the current to the load.

7 Claims, 1 Drawing Sheet

POWER SOURCE FOR EMERGENCY LIGHTING SYSTEMS

BACKGROUND OF THE INVENTION

1. Field of the Invention

The invention is directed to emergency signal displays, and more particularly to circuitry for controlling such displays.

2. Related Art

U.S. Pat. No. 3,869,639 discloses a control circuit for switching a gaseous lamp between dim and bright output in an emergency, such as line failure, using the increased impedance of a ballast capacitor.

U.S. Pat. No. 4,298,869 relates to an LED display using a combination of serially and parallely connected LEDs powered by a full-wave rectifying circuit and a smoothing circuit.

U.S. Pat. No. 4,388,615 discloses stand-by battery equipment used when the mains supply fails and is tested at regular intervals by disconnecting the mains supply.

U.S. Pat. No. 4,544,910 relates to an emergency exit sign auxiliary lamp flashing system operated from self-contained rechargeable batteries upon failure of the AC power mains and using a solid state circuit which automatically self tests the proper functioning of the system to ensure that it is serviceable in case of an emergency.

U.S. Pat. No. 4,682,147 discloses an emergency sign with a control circuit supplying power to serially-connected LEDs which are illuminated continuously during normal operation and which alternately switches the LEDs on and off during a power failure.

SUMMARY OF THE INVENTION

Emergency lighting systems typically utilize low power light emitting components and these components may be LED devices. LEDs exhibit a v-i characteristic which makes them particularly suitable for use with a current source, as opposed to the use of a voltage source.

In accordance with this invention, it is of primary concern to provide a buck/boost converter as the current source for components which exhibit or otherwise benefit from the use of a current source rather than a voltage source. By "buck/boost converter" is meant a high frequency converter for dc-to-dc operation in which the output power is substantially constant and independent of the output voltage.

It is also of primary concern in connection with this invention to provide the combination of first and second converter means in which the first converter means is in the form of a high frequency dc-to-dc flyback converter having an ac input and a battery simulated output voltage and the second converter means is in the form of a buck/boost converter as previously defined.

Within the frame work of the above combinations it is significant that the first and second converter means may each be respective first and second oscillator means. The first oscillator means is effective to repetitively generate a current-limited output which may be used to charge the battery, and the second converter or oscillator means providing a dc current source for supplying current to the load. Furthermore, the second converter or oscillator means may include switching means for repetitively transferring current to the load. Moreover, the second converter or oscillator means may include a current sensor means operating in conjunction with the switching means closed to change the state of the second converter or oscillator means to open the switching means and initiate release of the current to the load, which may comprise a plurality of parallely-connected LEDs.

The circuitry of the invention controls the operation of LED exit signs and operates in brown-out conditions without draining battery reserve, for example down to 80–90 VRMS continuously and to 50–60 VRMS for short durations of 5 to 50 minutes.

The LED control circuit of the invention operates from 120 V to 277 V automatically without circuit modifications or separate wiring.

The circuit is designed such that a shorted LED fuses open, thereby allowing the remaining LEDs to continue to operate.

The circuit provides constant current to the LEDs over the entire useful battery voltage range, i.e., for example from float voltage of approximately 14.2 volts down to the end of discharge voltage of approximately 10.2 volts, thus providing constant light output both on line and throughout the battery burn time.

The circuitry operates during emergency conditions with AA batteries, which are less expensive and considerably less heavy and bulky than other type batteries used by some prior art exit sign control circuitry.

It is a primary object of the invention to provide constant current to a load that is amenable to being driven from a current source, for example a plurality of LEDs, over the useful range of the emergency battery voltage to provide constant light output from the LEDs.

BRIEF DESCRIPTION OF THE DRAWING

The above objects, features and advantages of the invention are apparent from the following description of a preferred embodiment of the best mode of carrying out the invention when taken in conjunction with FIGS. 1A and 1B directed to an operative circuit diagram of the invention.

DETAILED DESCRIPTION OF THE INVENTION

Figure 1A:
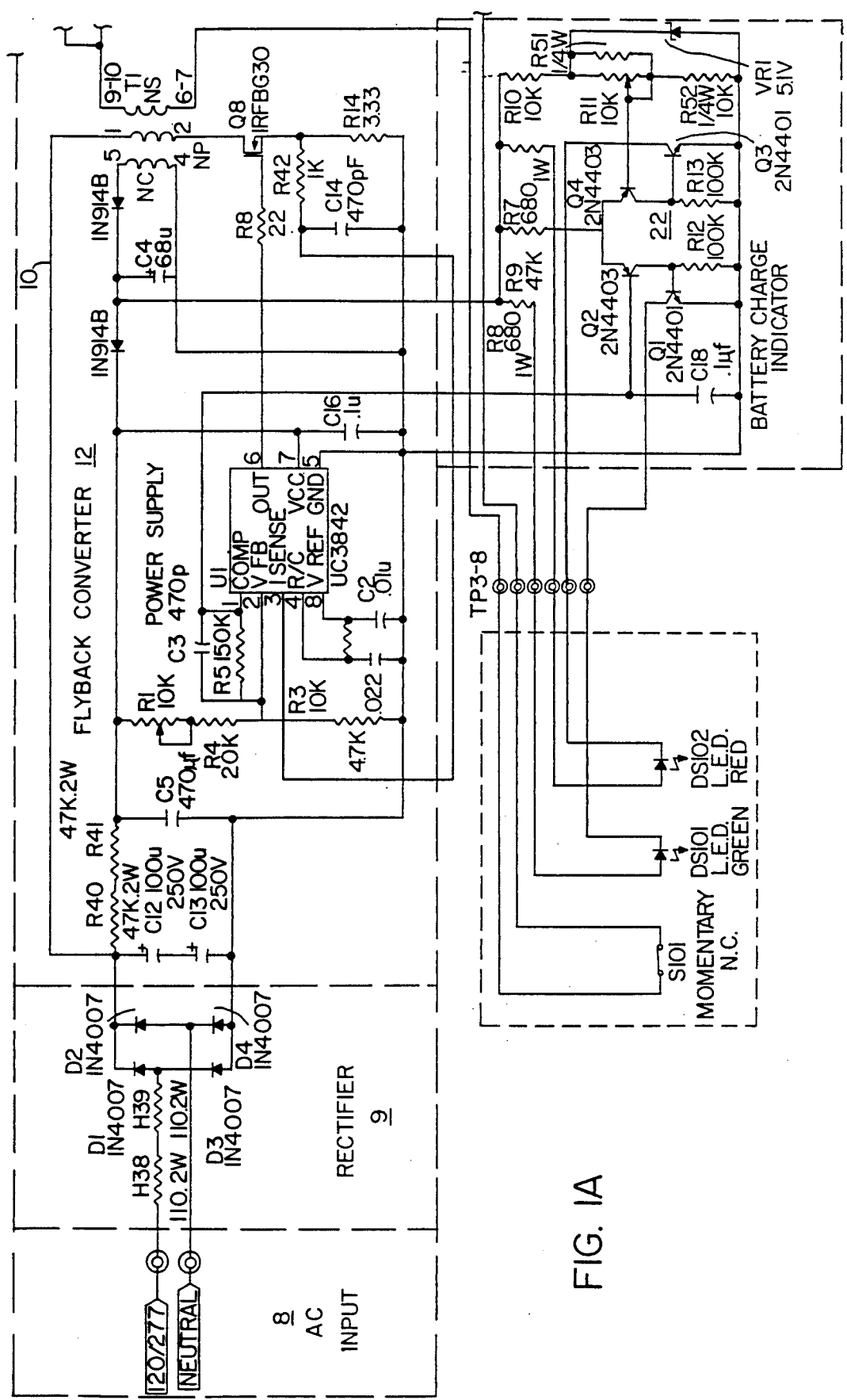
Figure 1B:
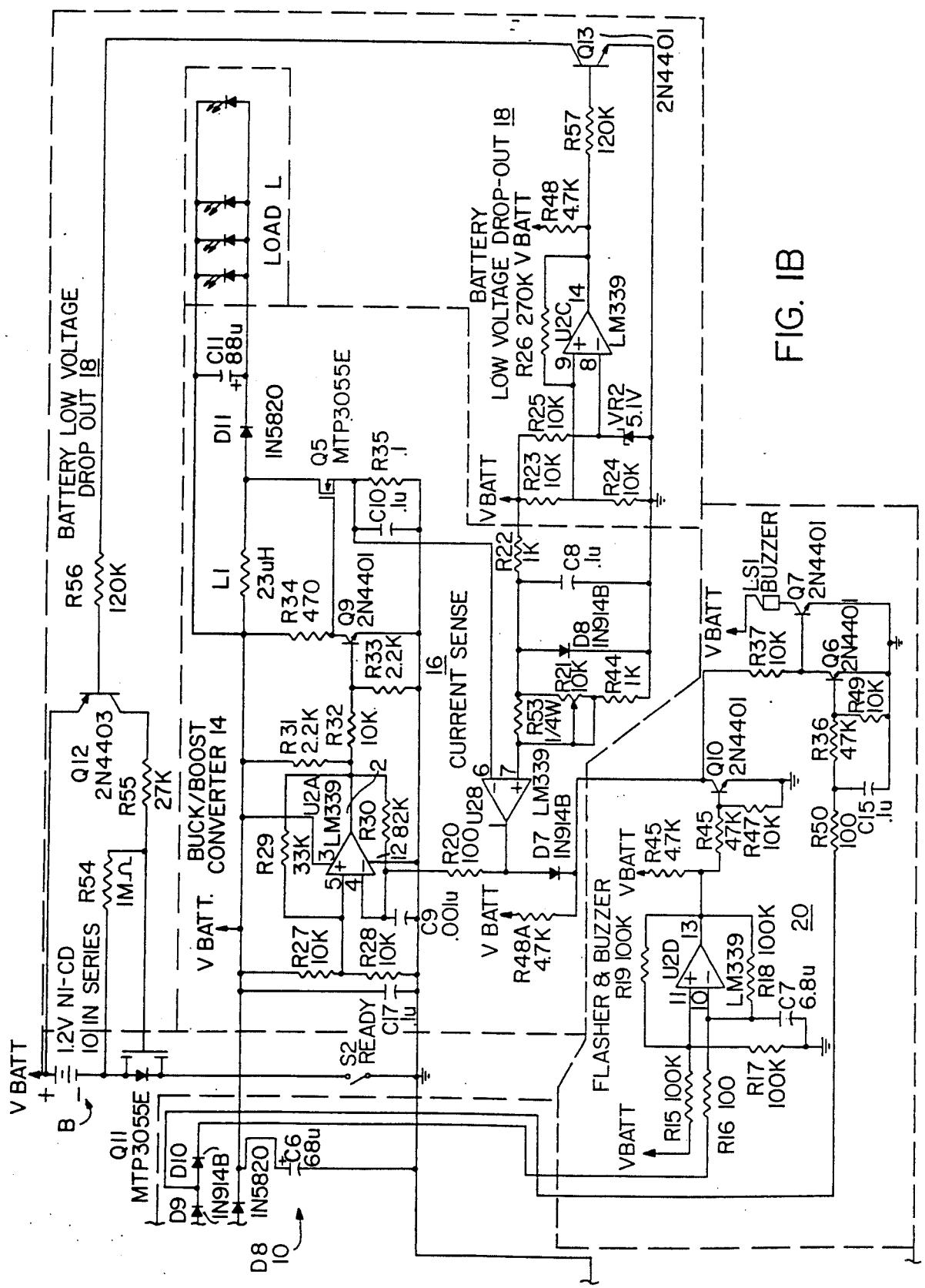

As shown in FIGS. 1A and 1B, an ac input 8 is provided to the terminals TP1 and TP2. It is a particular feature of this invention that such ac input may vary in voltage over a relatively wide range. For example, the ac input 8 may accept a standard voltage such as 120 volts and may range up to 277 volts. Rectifier 9 receives the ac input 8 and includes resistors R38 and R39 provided to limit the peak in-rush currents and also to limit the peak currents during normal operations; and diodes D1–D4 which form a full wave rectifier bridge feeding th capacitors C12 and C13 in the input of flyback converter 12. The conductor 10 applies the voltage across the capacitors C12 and C13 to the primary winding NP of the transformer T1 and forms part of the power stage of the flyback converter.

The flyback converter 12 includes the active controller U1 which is a standard 3842 control IC made for current mode flyback converters. The controller U1 is started by the voltage across the capacitor C5 which is slowly charged by the input current through resistors R40 and R41 and by the charging of capacitor C16 to provide operating voltage Vcc at pin 7 of the controller U1. The activation of the controller U1 provides an output on pin 6 thereof, thereby turning ON the FET Q8 through the resistor R6. The FET Q8 is maintained ON as the current through the primary winding NP is charging by capacitor C14 and ramps up to a level at "I sence" pin 3 of the controller U1 that is commanded by a built-in error amplifier which forms part of the controller U1. When that current reaches the commanded current level, the controller U1 will turn the FET Q8 OFF.

In response to the cessation of current flow into the primary winding NP, the stored magnetic energy in transformer T1 forces a current discharge in secondary winding NS through diode D6 and a current discharge through control winding NC and diode D5 into capacitor C4 and C6, respectively. The diode D6 is used to charge the capacitor C6 and provide the power source for the buck/boost converter circuit 14 when the ac input is present. When the ac input is not present and thus there is no power source for the flyback converter 12, the battery B, which may be a series of 1.2 volt nickel-cadmium battery elements, operates in parallel with the capacitor C6 to provide the power source for the buck/boost converter 14 (to be described more fully hereinafter). Returning to the operation of the flyback converter circuit 12, the controller U1 includes a built-in reference and error amplifier which compares a feedback voltage generated from the control winding NC, as the FET Q8 is turn OFF, through the diode D5, to charge capacitor C4 through diode D12 and capacitor C5. That feedback voltage is applied to the Vcc pin 7 to provide operating power to the controller U1. With the component values and type UC3842 controller as shown in the drawing Figure, a voltage of, for example, between 10 volts and 16 volts is necessary for the operation of the controller U1. That is, controller U1 is ON with a voltage of, for example 16 volts, and is OFF with a voltage of, for example, 10 volts at Vcc pin 7.

The feedback voltage is divided down by the potentiometer R1 and the resistors R4 and R2 to form the feedback voltage which is input to the voltage feedback (V FB) pin 2 of the controller U1. Compensation (COMP) pin 1 is an output terminal for the previously mentioned error amplifier. The feedback voltage at pin 1 is divided down within controller U1 and used as an internal reference to compare the "I sense" current at pin 3 of the controller U1. The current "I sense" is generated during the conduction of the FET Q8 by the circuit consisting of resistors R14 and R42 and capacitor C14 connected to the source electrode of the FED Q8 as shown in the drawing Figure. When the "I sense" current reaches a predetermined level, determined by the afore-mentioned error amplifier within controller U1, an internal comparator toggles an internal flip-flop(both also within the controller U1), to provide an output at pin 6 through resistor R6 to turn the FET Q8 OFF. A reference voltage is applied from the controller U1 at pin 8 (v REF) to the junction of the capacitor C2 and the resistor R3, and a time constant establishing the frequency of operation of the controller U1 is generated by the junction of the capacitor C1 and the resistor R3.

While the ON time of controller U1 is variable, it is operated in a substantially constant frequency mode. With the component values specified in the drawing Figure, controller U1 operates at a frequency of approximately 9 KHz. It is useful to keep the operating frequency of the flyback converter 12 less than 10 KHz to avoid the necessity of complying with FCC regulations.

Once the controller U1 is enabled, as described above, it draws more current than can be supplied through the resistors R40 and R41. However, the operation of controller U1 will continue to operate to maintain the operation of flyback converter 12 as previously described. This is accomplished by selecting the size of the capacitor C5, the turns ratio of the control winding NC, so that before C5 discharges below approximately 10 volts, the core of transformer T1 releases its stored energy and the secondary winding NS transfers the energy so that the dc voltage output across the capacitor C6 is sufficient. The voltage across the capacitor C6 is dependent upon the discharge state of the battery B, as it, and battery switch Q11 (a power FET of the type MTP3055E) are connected in parallel with the capacitor C6. Thus if the battery is too discharged, the controller U1 goes through several false starts, turns OFF for several seconds until the capacitor C5 is charge up again through the resistors R40 and R41, when the controller U1 again attempts to start up. It is noted that the charging time constant of the resistors 40, 41 and the capacitor C5 is not decreased by making the resistance of the resistors R40 and R41 smaller to avoid an increase in continuous power dissipation during normal operation of the flyback converter 12.

Once the flyback converter is operating, it will continue to operate until the voltage at Vcc pin 7 of the controller U1 falls below approximately 10 volts. As stated above, the flyback converter 12 will attempt to product a constant voltage across the capacitor C6. However, if the battery voltage is too discharged to support the voltage across the capacitor C6, the flyback converter will operate in a current-limited mode, delivering as much current as is possible, which current is in excess of the current required by the load L and the buck/boost converter 14, to charge the battery B. Once the battery B is recharged, and since it is essentially in parallel with the capacitor C6 (assuming ready switch S2 and battery switch Q11 are closed), power for operation of the buck/boost converter 14 is provided by the capacitor C6, and the battery B is in a "float" mode.

The basic buck/boost converter 14 includes the inductor L1 (which stores energy ($\frac{1}{2}Li^2$) and releases that energy to the load L), the switch Q5 (which controls the release of current to the load L), the diode D11 (which passes the flyback energy of inductor L1) and the capacitor C11 (which is charged by the current from the inductor L1 through diode D11 and provides a smooth output voltage). When the switch Q5 is turned ON by Buck/Boost controller U2A (which in turn is turned ON by the voltage at the junction of the divider network formed by the resistors R27 and R28 in parallel with capacitor C6), controller U2A operates as a multivibrator and during each cycle of operation switch Q5 is prematurely turned OFF when the current through the inductor L1 and switch Q5 is sensed as a voltage proportional to the current by sensing resistor R35. When that voltage reaches a predetermined level (which is a function of the setting of potentiometer R21 in the current sensor 16) at the noninverting input at the pin 7 of comparator U2B it will toggle and its output at the pin 1 will go down. That low voltage will quickly discharge the timing capacitor C9 to zero which will terminate the end of the portion of the cycle where the switch Q5 is closed or is conductive because comparator U2A toggles so that the output at the pin 2 is high, thereby switching the transistor Q9 from an OFF state to an ON state and thereby turning the transistor switch Q5 OFF. The voltage at sensing resistor 35 then drops to ground voltage and the output at pin 1 of comparator U2B in the current sensor 16 is opened (an inherent characteristic of comparator type LM339), which allows the controller or astable multivibrator U2A to freely complete the second portion of its cycle. The free-running operating frequency of oscillator U2A is approximately 9 KHz, put under 10 KHz, again to avoid having to comply with FCC regulations.

The ON time of comparator U2A, namely the time during which the switch Q5 is on, is a small portion of the total period that the buck/boost oscillator operates. Therefore, as the battery voltage varies, and correspondingly the time that it takes the current through the inductor L1 to "ramp up" to that prescribed value varies slightly, and thus it only adds a small variation to the overall oscillation period such that the overall operating frequency remains approximately fixed. Given that the overall operating frequency is approximately fixed, and the current in the inductor L1 is being "ramped up" to the same peak current level, the energy ($\frac{1}{2}Li^2$) that is stored in the inductor L1 and then is subsequently delivered to the load L is occurring at approximately a constant frequency. Power is equal to energy times frequency, and therefore the power delivered to the load is approximately constant.

This constant power output is, in the preferred embodiment of the invention, being delivered to a plurality of parallely-connected LEDs. LEDs have a voltage-current relationship which makes them very amenable to being driven by a constant current source, much more so than by a constant voltage source. Moreover, LEDs are equally amenable to being driven by a constant power source. Consequently, the buck/boost converter is ideally suited to driving the LEDs.

The battery B is connected in series with the FET switch Q11 and ready switch S2 and that series-connection of components is connected in parallel with the capacitor C6 as is shown in the drawing Figure. The operation of the FET switch Q11 is controlled by the battery low voltage drop-out circuit, which is essentially a comparator which senses the battery voltage divided down by the resistors R23 and R24 and compares that voltage with a reference voltage established on the cathode of zener diode VR2. The comparator U2C has a small amount of hysteresis provided by the resistor R26. When the battery voltage drops to approximately 10.2 volts, the output on pin 14 of the comparator U2C is low such that transistor Q13 turns OFF which removes the base current from the transistor Q12, thereby turning it OFF. With FET switch Q12 OFF there is no collector current and no current flows through the resistors R54 and R55. The resistor R54 then discharges the gate-to-source capacitance of the FET switch Q11, and when that is discharged, resistor R54 holds the gate of FET switch Q11 at approximately its source voltage of zero volts, turning FET switch Q11 OFF. With Q11 OFF, the return path from the circuit common ground of the secondary side is disconnected and that effectively disconnects the battery from that circuitry.

The disconnection of the battery B from the circuit reduces the voltage across the voltage divider formed by the series connection of the resistors R23 and R24, thereby ensuring that the low voltage drop-out circuit 18 maintains the FET switch Q11 in an OFF state. Such circumstances occur where the ac input has disappeared and the emergency lighting system is operating in the emergency mode, i.e. operating from battery power, and such operation has discharged the battery long enough for the battery to get down to a sufficiently low voltage that it is prudent to disconnect the battery to prevent further discharge of it. With the battery thus disconnected the emergency lighting system of the invention will not turn on again without ac power. As previously described the flyback converter 12 then provides a voltage across capacitor C6 that is sufficiently high (for example approximately 10.2 volts) to enable thereby enabling comparator U2C to turn the transistors Q13, Q12 and the FET switch Q11 on to switch the battery B in the circuit to be recharged by the operation of the flyback converter 12 as described above. Once the battery B has been thus recharged it will remain connected in the circuit as long as its voltage remains greater than approximately 10.2 volts.

It is also of significance to note that the battery B could be recharged, even if FET switch Q11 was not turned on, through the path provided by the internal parasitic diode, which path is parallel to the drain source of the FET switch Q11. Thus, if the battery B was severely discharged, it could still be recharged to enable normal operation of the emergency lighting system circuitry.

The buck/boost converter 14 includes an oscillator means which is provided principally by controller U2A. The function of this oscillator means is to control the delivery of current to the load L from the voltage source capacitor C6, the current being transferred first through the inductor L1 over the path that includes the FET switch Q5 and the resistor R35 and then from the inductor L1 to the load through the diode D11 and filter capacitor C11. Typically, the load will be a plurality of LEDs in parallel, substantially as is shown. The oscillator means U2A biases the transistor Q9 OFF so that the FET Q5 is turned on. When the switch Q5 is conducting, current through R5 quickly charges capacitor C10 to a positive voltage on the inverting input on the current sensor comparator U2B such that the output thereof is toggled low, and consequently permits the timing capacitor C9 to quickly discharge through the resistor R20, thereby toggling the second oscillating means comparator U2A to its second state of oscillation. That is to say, the first state of oscillation is controlled by the time taken for the current to "ramp up" from zero to that value which it attains with respect to the voltage level on the pin 7 of comparator U2B. That level is adjustably set by the network including the resistor R53, the potentiometer R21 and the resistor R44, diode D8 parallely connected with the capacitor C8 and with the series connected potentiometer R21 and resistor R44, and finally with the resistor R22 connected to VBatt. This time is at least slightly less than the time for the free-running time for this state and is determined largely by the discharge state of the battery and the value of L1. In any event, the discharge of the timing capacitor C9 prematurely toggles the second oscillator means U2A to its second state. It is to be noted that the period of the second state is greater than the period of the first state, so that the variation in timing of the first state as described, does not greatly affect the operating frequency of the buck/boost converter 14.

The emergency lighting system of the invention operates under the following conditions:

(1) The ac input is available and the battery B is fully charged so that the load L is driven by the constant current output of the inductor L1 through the diode D11.

(2) The ac input is not available and the battery is sufficiently charged to operate the secondary oscillating means to provide current to the load.

(3) The ac input is available and the battery requires charging so that the flyback converter 12 operates in a current limited mode and delivers a current in excel of the current required by the load and the buck/boost converter 14 to charge the battery.

The flasher circuit and the buzzer circuit 20 are enabled when there is no input to the flyback converter 12 so that the LEDs comprising load L all simultaneously flash at approximately ½–1 Hz, and the buzzer LS1 buzzes at the same frequency. This provides a readily discernable warning that there is no ac power in the building, for example, where the emergency exit sign is located. The operation of the flasher and buzzer circuits 20 is believed to be evident from the schematic shown in the drawing Figure.

Similarly, the emergency lighting system provides an indication of the charge condition of the battery by actuating a green LED when the battery B voltage is greater than, for example, approximately 14.2 volts (essentially the fully charged state of battery B) and actuating a red LED when the battery B voltage is less than approximately 14.2 volts. This indication is provided by battery charge indicator 22. The operation of the battery charge indicator 22 is believed to be evident from a consideration of that circuit as shown in the drawing Figure.

A normally closed momentary open test switch S101 is inserted between terminals 6–7 of the secondary winding NS and ground as shown in the drawing Figure.

The above embodiment of the invention has been described solely for the purpose of providing a description of the structure and operation of the invention. Those of ordinary skill in the art design of dc power control circuitry will recognize modifications of the above-described circuitry. Thus, the invention is intended to be limited only by the following claims and the equivalents to which the various components thereof are entitled.

What is claimed is:

1. In a power source for a battery operated system, the combination comprising:

dc power source means for providing a battery-simulating voltage a high frequency dc-to-dc input converter means for supplying power to said dc power source means;

a substantially constant current demand load;

second converter means for repetitively transferring current from said dc power source means to said load and including an inductor means and a capacitor parallely connected to said load and a diode electrically connecting said inductor and said capacitor, switching means for alternately storing and releasing current from said inductor means to said load and connected in series with said inductor; and battery means in parallel with said dc power source means for maintaining the voltage on said dc power source means and operating said second converter means in the absence of power by said input converter means.

2. The power source as claimed in claim 1, wherein the dc power source means includes a capacitor connected across said second converter means and said high frequency dc-to-dc input converter means includes a transformer having a primary winding connected across the input of said high frequency dc-to-dc input converter means and a secondary winding connected across said capacitor for transferring current to charge said capacitor and provide power to said second converter means.

3. The power source as claimed in claim 1, wherein said second converter means operates as an oscillator means.

4. The power source as claimed in claim 1, wherein said second converter means further includes current sensor means operative with said switching means closed to change the state of said second converter means to open said switching means.

5. The power source as claimed in claim 1, wherein said load includes a plurality of LEDs.

6. The power source as claimed in claim 5, wherein said plurality of LEDs are connected in parallel.

7. The power source as claimed in claim 1, wherein said battery means includes second normally closed switching means interconnecting said battery means in parallel with said dc power source means, and the combination further comprising battery low voltage dropout means sensing the voltage of said battery means and opening said second switching means when the voltage of said battery means falls below a predetermined voltage.

* * * * *